United States Patent

Letchford et al.

[11] Patent Number: 6,153,706
[45] Date of Patent: Nov. 28, 2000

[54] PROTECTED MULTI-FUNCTIONALIZED STAR POLYMERS AND PROCESSES FOR MAKING THE SAME

[75] Inventors: Robert James Letchford, Cherryville; James Anthony Schwindeman, Lincolnton, both of N.C.

[73] Assignee: FMC Corporation, Philadelphia, Pa.

[21] Appl. No.: 09/123,533

[22] Filed: Jul. 28, 1998

Related U.S. Application Data

[60] Provisional application No. 60/054,192, Jul. 30, 1997.

[51] Int. Cl.$^7$ .......................... C08F 297/04; C08C 19/22
[52] U.S. Cl. .................. 525/314; 525/105; 525/131; 525/177; 525/184; 525/272; 525/359.1; 525/359.3; 526/178; 526/180; 526/181
[58] Field of Search ...................................... 525/313, 272, 525/105, 131, 177, 184, 359.1, 359.3; 526/178, 180, 181

[56] References Cited

U.S. PATENT DOCUMENTS

| | | |
|---|---|---|
| 3,280,084 | 10/1966 | Zelinski et al. . |
| 3,326,881 | 6/1967 | Uraneck et al. . |
| 3,629,172 | 12/1971 | Jones . |
| 3,639,517 | 2/1972 | Kitchen et al. . |
| 3,719,730 | 3/1973 | Hansley et al. . |
| 3,776,964 | 12/1973 | Morrison et al. . |
| 3,842,146 | 10/1974 | Milkovich et al. . |
| 3,862,100 | 1/1975 | Halasa et al. . |
| 3,954,894 | 5/1976 | Kamienski et al. . |
| 3,956,232 | 5/1976 | Uraneck et al. . |
| 3,985,830 | 10/1976 | Fetters et al. . |
| 4,039,593 | 8/1977 | Kamienski et al. . |
| 4,052,370 | 10/1977 | Halasa et al. . |
| 4,753,991 | 6/1988 | Bronstert . |
| 4,994,526 | 2/1991 | Peters . |
| 5,166,277 | 11/1992 | Goodwin et al. . |
| 5,310,490 | 5/1994 | Struglinski et al. . |
| 5,310,814 | 5/1994 | Struglinski et al. . |
| 5,321,148 | 6/1994 | Schwindeman . |
| 5,331,058 | 7/1994 | Shepherd et al. . |
| 5,336,726 | 8/1994 | DuBois . |
| 5,362,699 | 11/1994 | Shepherd et al. . |
| 5,376,745 | 12/1994 | Handlin, Jr. et al. . |
| 5,391,663 | 2/1995 | Bening et al. . |
| 5,393,843 | 2/1995 | Handlin, Jr. et al. . |
| 5,405,911 | 4/1995 | Handlin, Jr. et al. . |
| 5,416,168 | 5/1995 | Willis et al. . |
| 5,478,899 | 12/1995 | Bening . |
| 5,486,568 | 1/1996 | Bening et al. . |
| 5,502,131 | 3/1996 | Antkowiak et al. . |
| 5,521,255 | 5/1996 | Roy . |
| 5,565,526 | 10/1996 | Schwindeman et al. . |
| 5,567,774 | 10/1996 | Schwindeman et al. . |
| 5,798,418 | 8/1998 | Quirk .................................. 525/272 X |
| 5,919,870 | 7/1999 | Letchford et al. ................ 525/333.3 X |

FOREIGN PATENT DOCUMENTS

| | | |
|---|---|---|
| 0 189 672 | 8/1986 | European Pat. Off. . |
| 0 593 049 | 4/1994 | European Pat. Off. . |
| 0 632 075 | 1/1995 | European Pat. Off. . |
| 2 118 952 | 11/1983 | United Kingdom . |
| 2 241 239 | 8/1991 | United Kingdom . |
| 2 270 317 | 3/1994 | United Kingdom . |
| WO 91/12277 | 8/1991 | WIPO . |
| WO 93/04094 | 3/1993 | WIPO . |
| WO 95/22566 | 8/1995 | WIPO . |
| WO 97/05176 | 2/1997 | WIPO . |
| WO 97/06192 | 2/1997 | WIPO . |
| WO 97/16465 | 5/1997 | WIPO . |

OTHER PUBLICATIONS

D.N. Schulz et al., J. Poly. Sci. Polymer Chem. Ed. 12, 153–166 (1974).
M. Gardette et al., Tetrahedron 41, 5887–5899 (1985).
J. Almena, Tetrahedron 51, 11883–11890 (1995).
A.J. Dias et al., Rubber & Plastics News, pp. 18–20 (Oct. 31, 1988).
A.J. Dias et al., *Macromolecules* 20, 2068–2076 (1987).
L. Weber, "Functionalization of Living Polymers—Results and Problems," *Makromol. Chem., Macromol. Symp.* 3, 317–329 (1986).

*Primary Examiner*—Fred Teskin
*Attorney, Agent, or Firm*—Alston & Bird LLP

[57] ABSTRACT

This invention provides novel protected, multi-functionalized multi-arm polymers, their optionally hydrogenated analogues and optionally deprotected analogues thereof, and processes for making these compounds. In the invention, monomers are polymerized using a protected functionalized initiator to form living polymer anions, the living anions coupled to form multi-arm polymers, additional monomer added to form additional polymer arms, and the multi-arm polymer functionalized using electrophiles.

42 Claims, No Drawings

PROTECTED MULTI-FUNCTIONALIZED STAR POLYMERS AND PROCESSES FOR MAKING THE SAME

CROSS-REFERENCE TO RELATED APPLICATIONS

This application is related to copending provisional Application Serial No. 60/054,192, filed Jul. 30, 1997, the entire disclosure of which is hereby incorporated by reference, and claims the benefit of its filing date under 35 USC 119(e).

FIELD OF THE INVENTION

This invention concerns multi-branched functional polydiene polymers, polyarylene polymers and polydiene/polyarylene copolymers, as well as their hydrogenated and/or deprotected analogues, and processes for making the same.

BACKGROUND OF THE INVENTION

Multi-branched or star-shaped polymers were first described by Zelinski in U.S. Pat. No. 3,280,084. The Zelinski patent reports coupling polybutadiene anion (generated by addition of butyllithium to butadiene) with 0.02 to 1 part by weight of divinylbenzene to 100 parts of monomer. The resultant star polymer had a polydivinylbenzene core and several identical arms of polybutadiene radiating from the core. The arms could also be either random or block copolymers of styrene and butadiene, wherein the diene is the major component.

U.S. Pat. No. 3,639,517 to Kitchen et al. describes the synthesis of star polymers with arms of different molecular weights. U.S. Pat. No. 3,985,830 to Fetters and Bi details the preparation of star polymers with a nucleus of more than one molecule of divinylbenzene and more than three arms. These polymers were formed by addition of living homopolymers and copolymers of conjugated diene monomers and block copolymers of conjugated diene monomers and monovinylaromatic monomers to divinylbenzene. These unfunctionalized star polymers have been employed as viscosity index (V.I.) improvers for lube oil compositions (see for example, U.S. Pat. Nos. 5,310,490 and 5,310,814).

Star polymers have also been prepared which contain functionality, such as hydroxy groups, at the ends of the arms. For instance, European Patent Application 0632075 disclosed the preparation of star molecules with hydroxyl groups at the terminus of each arm of the star. These polymers were prepared by addition of ethylene oxide to the living anions at the ends of the arms of the star polymer. These functionalized star polymers were useful in making adhesives, sealants, coatings, films and fibers. However, the functionalization reactions described therein are often inefficient, due to the formation of physical gelation phenomena that produce severe mixing problems (see L. Weber, Makromol. Chem., Macromol. Symp., 3, 317 (1986) and U.S. Pat. No. 5,478,899).

SUMMARY OF THE INVENTION

The present invention provides novel protected, functionalized multi-arm polymers as well as their optionally hydrogenated analogues and their optionally deprotected analogues. The star polymers of the invention are prepared by polymerizing monomers using protected functionalized organometallic initiators to form living polymer anions having a protected functional group incorporated into the structure thereof. The living polymer anions are then coupled using a crosslinkable coupling agent to form a living multi-arm polymer having a central core and protected functional groups on the ends of the polymer arms. Additional monomer is then added to grow additional living arms from the central core. These living arms can then be end capped with a suitable functionalizing or capping agent.

In contrast to star polymers of the prior art, the molecular architecture of compounds of the present invention can be precisely controlled. The monomer identity, the monomer composition and molecular weight of the functional arms can be independently manipulated by varying the monomer charged to the initiator. High functionalization of the living polymer anions is achieved, as the functionalizing agents of the current invention do not cause gelation to occur upon their addition to a living polymer. The nature of the functional groups and the protecting groups can be varied simply by changing the protected functional initiator and the functionalizing agent. In addition, the number of polymer arms can be adjusted by varying the nature of the coupling agent and the ratio of living polymer to the coupling agent.

The present invention also provides processes for preparing the polymers of the invention, which can provide efficient functionalization of the living polymer anions.

DETAILED DESCRIPTION OF THE INVENTION

The novel functionalized multi-arm star polymers of the invention include compounds of the formulas below:

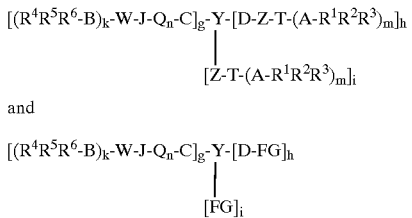

and wherein:

R$^1$, R$^2$, R$^3$, R$^4$, R$^5$, and R$^6$ are each independently selected from the group consisting of hydrogen, alkyl, substituted alkyl, aryl, substituted aryl, cycloalkyl, and substituted cycloalkyl, or R$^4$ is optionally a —(CR$^7$R$^8$)$_1$— group linking two B when k is 2, or R$^3$ is optionally a —(CR$^7$R$^8$)$_1$— group linking two A when m is 2, wherein R$^7$ and R$^8$ are each independently selected from the group consisting of hydrogen, alkyl, substituted alkyl, aryl, substituted aryl, cycloalkyl, and substituted cycloalkyl and 1 is an integer from 1 to 7;

A and B are each independently selected from Group IVa of the Periodic Table of the Elements;

T and W are each independently selected from the group consisting of oxygen, sulfur, and nitrogen and mixtures thereof;

J is a branched or straight chain hydrocarbon connecting group which contains 3–25 carbon atoms, optionally substituted with aryl or substituted aryl;

Z is a branched or straight chain hydrocarbon connecting group which contains 1–25 carbon atoms, optionally substituted with aryl or substituted aryl;

Q is an unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds;

k and m are each independently 1 when T or W is oxygen or sulfur, and 2 when T or W is nitrogen;

n is an integer from 0 to 5;

C represents a hydrogenated or unsaturated block derived by anionic polymerization of one or more conjugated dienes(for example 1,3-butadiene and/or isoprene), one or more alkenylsubstituted aromatic compounds (for example, styrene and/or alpha-methylstyrene), or a mixture thereof, and having a peak molecular weight from 1000 to 10,000 as measured by GPC;

Y represents a crosslinked core derived by incorporation of a molecule having at least two independently polymerized vinyl groups, such as meta-divinylbenzene or para-divinylbenzene;

D represents a hydrogenated or unsaturated block derived by anionic polymerization of one or more conjugated dienes (for example 1,3-butadiene and/or isoprene), one or more alkenylsubstituted aromatic compounds (for example, styrene and/or alpha-methylstyrene) or a mixture thereof, and having a peak molecular weight from 400 to 40,000 as measured by GPC;

FG is a protected or unprotected functional group; and h is 1 to 40; g is 1 to 50; and i is <20, with the proviso that both g and h are not 1.

As used herein, the term "alkyl" refers to straight chain and branched C1–C25 alkyl. The term "substituted alkyl" refers to C1–C25 alkyl substituted with one or more lower C1–C10 alkyl, lower alkoxy, lower alkylthio, or lower dialkylamino. The term "cycloalkyl" refers to C3–C12 cycloalkyl. The term "substituted cycloalkyl" refers to C31–C12 cycloalkyl substituted with one or more lower C1–C10 alkyl, lower alkoxy, lower alkylthio, or lower dialkylamino. The term "aryl" refers to C5–C25 aryl having one or more aromatic rings, each of 5 or 6 carbon atoms. Multiple aryl rings may be fused, as in naphthyl or unfused, as in biphenyl. The term "substituted aryl" refers to C5–C25 aryl substituted with one or more lower C1–C10 alkyl, lower alkoxy, lower alkylthio, or lower dialkylamino. Exemplary aryl and substituted aryl groups include, for example, phenyl, benzyl, and the like.

The polymers of the invention can be prepared as follows. One or more protected functional alkali metal initiators is reacted with one or more monomers selected from the group consisting of conjugated dienes, mixtures of conjugated dienes, alkenylsubstituted aromatic compounds, mixtures of alkenylsubstituted aromatic compounds, and mixtures of one or more conjugated dienes and one or more alkenyl-substituted aromatic compounds, to afford a living polymer anion. Exemplary protected functional initiators have the following structures:

$$(R^4R^5R^6-B)_k-W-J-Q_n-M \quad (I)$$

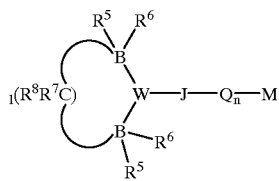

(II)

wherein:

M is an alkali metal selected from the group consisting of lithium, sodium and potassium;

$R^4$, $R^5$, $R^6$, $R^7$, and $R^8$ are each independently selected from the group consisting of hydrogen, alkyl, substituted alkyl, aryl, substituted aryl, cycloalkyl, and substituted cycloalkyl;

B is an element selected from Group IVa of the Periodic Table of the Elements;

W is selected from the group consisting of oxygen, sulfur, and nitrogen and mixtures thereof;

J is a branched or straight chain hydrocarbon connecting group which contains 3–25 carbon atoms, optionally substituted with aryl or substituted aryl;

Q is an unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M-J linkage;

l is an integer from 1 to 7;

k is 1 when W is oxygen or sulfur, and 2 when W is nitrogen; and n is an integer from 0 to 5. In this regard, the skilled artisan will appreciate that $R^4$ as used herein includes the group

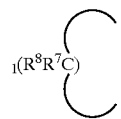

linking two B groups when k of formula (I) is 2.

A suitable coupling agent having at least two independently polymerizable vinyl groups as known in the art, such as but not limited to the isomeric divinylbenzenes and diisopropenylbenzenes, is then added to the living polymer anions to form a multi-arm living star polymer having a central crosslinked core derived from the coupling agent. Further quantities of one or more conjugated dienes, one or more alkenylsubstituted aromatic compounds, or mixtures thereof are added to the multi-arm living polymer to grow new, living arms from the central core.

Finally, one or more functionalizing agents or reactive agents are added to end cap the living polymer ends. Exemplary functionalizing agents includes compounds of the following structure:

$$X-Z-T-(A-R^1R^2R^3)_m \quad (III)$$

wherein:

X is halogen selected from the group consisting of chloride, bromide and iodide;

Z is a branched or straight chain hydrocarbon connecting group which contains 1–25 carbon atoms, optionally substituted with aryl or substituted aryl;

T is selected from the group consisting of oxygen, sulfur, and nitrogen and mixtures thereof;

A is an element selected from Group IVa of the Periodic Table of the Elements;

$R^1$, $R^2$, and $R^3$ are each independently selected from the group consisting of hydrogen, alkyl, substituted alkyl, aryl, substituted aryl, cycloalkyl, and substituted cycloalkyl, or $R^3$ is optionally a $-(CR^7R^8)_1-$ group linking two A when m is 2, wherein $R^7$ and $R^8$ are each independently selected from the group consisting of hydrogen, alkyl, substituted alkyl, aryl, substituted aryl, cycloalkyl, and substituted cycloalkyl and 1 is an integer from 1 to 7; and m is 1 when T is oxygen or sulfur, and 2 when T is nitrogen. Similar to the definition of $R^4$ above, the skilled artisan will appreciate that $R^3$ as used herein includes the group

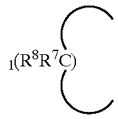

linking two A groups when m of formula (III) is 2.

The functionalizing agents III can be prepared as described, for example, in International Publication WO 97/16465, the entire disclosure of which is incorporated by reference. In addition, the electrophiles can be prepared as described in K. Ueda, A. Hirao, and S. Nakahama, Macromolecules, 23, 939 (1990); U.S. Pat. No. 5,496,940; U.S. Pat. No. 5,600,021; U.S. Pat. No. 5,362,699; A. Alexakis, M. Gardette, and S. Colin, Tetrahedron Letters, 29, 1988, 2951; B. Figadere, X. Franck, and A. Cave, Tetrahedron Letters, 34, 1993, 5893; J. Almena, F. Foubelo, and M. Yus, Tetrahedron, 51, 1995, 11883; D. F. Taber and Y. Wang, J. Org. Chem., 58, 1993, 6470; F. D. Toste and I. W. J. Still, Synlett, 1995, 159; and U.S. Pat. No. 5,493,044. The functionalization step can be conducted at temperatures ranging from about −30° C. to about 150° C.

Exemplary reactive agents include any of the types of compounds known in the art for terminating or end capping living polymer anions. Examples of suitable reactive compounds include, but are not limited to, alkylene oxides, such as ethyene oxide, propylene oxide, styrene oxide and oxetane; oxygen; sulfur; carbon dioxide; halogens, such as chlorine, bromine and iodine; haloalkyltrialkoxysilanes, halotrialkylsilanes, alkenylhalosilanes, and omega-alkenylarylhalosilanes such as chlorotrimethylsilnae, styrenyldimethyl chlorosilane; sulfonated compounds, such as 1,3-propanesultone; amides, including cyclic amides, such as caprolactam, N-benzylidene trimethylsilylamide, dimethylformamide; silicon acetals; 1,5-diazabicyclo[3.1.0] hexane; allyl halides, such as allyl bromide, and allyl chloride; methacryloyl chloride; amines, including primary, secondary, tertiary amines, and cyclic amines, such as 3-(dimethylamino)-propyl chloride; epihalohydrins, such as epichlorohydrin, epibromohydrin, and epiiodohydrin, and other materials as known in the art to be useful for terminating or end capping polymers. These and other useful functionalizing agents are described, for example, in U.S. Pat. Nos. 3,786,116 and 4,409,357. The functionalization step can be conducted at temperatures ranging from about −30° C. to about 150° C.

Both the functionalizing agents of formula III and the reactive agents described above are electrophiles capable of end capping living polymer ends. When a functionalizing agent of formula III is used to end cap the living polymer ends, the capping or end group is designated in the structures of the compounds of the invention as $-Z-T-(A-R^1R^2R^3)_m$. When a reactive agent as defined above is used to end cap the living polymer ends, the capping or end group is designated in the structures of the compounds of the invention as "FG".

This procedure efficiently functionalizes each living anion site of the multi-arm polymer with a protected functional group, which could be identical or different from the protected functionality of the initiator. In the latter case, the protecting groups can be removed selectively by the deprotection methods outlined below. The nature of the protected functional groups can be varied by merely changing the identity of the electrophile and/or the functional initiator.

The initiators of the formulae

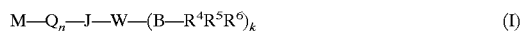

and

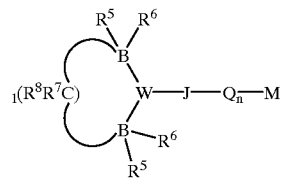

are prepared by reacting a compound of the formula

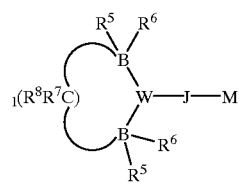

wherein M, J, W, B, $R^4$, $R^5$, $R^6$, $R^7$, $R^8$, k, and l have the meanings ascribed above, with one or more conjugated diene hydrocarbons, one or more alkenylsubstituted aromatic compounds, or mixtures of one or more dienes with one or more alkenylsubstituted aromatic compounds, to form an extended hydrocarbon chain between M and J in formulae (IV) and (V), which extended chain is denoted as Qn in formulae (I) and (II). The compounds of formula (IV) and (V) are prepared by first reacting in an inert solvent a selected tertiary amino-1-haloalkane, an omega-hydroxy-protected-1-haloalkane, or an omega-thio-protected-1-haloalkane, depending on whether "W" is to be N, O or S (the alkyl portions of the haloalkyl groups contain 3 to 25 carbon atoms) with an alkali metal, preferably lithium, at a temperature between about 35° C. and about 130° C., preferably at the solvent reflux temperature, to form a protected monofunctional lithium initiator (of formula IV or V) which is then optionally reacted with a one or more conjugated diene hydrocarbons, one or more alkenylsubstituted aromatic compounds, or mixtures of one or more dienes with one or more alkenylsubstituted aromatic compounds, in a predominantly alkane, cycloalkane, or aromatic reaction solvent, which solvent contains 5 to 10 carbon atoms, and mixtures of such solvents, to produce a monofunctional initiator with an extended chain or tether between the metal atom (M) and element (W) in formulae (I) and (II) above and mixtures thereof with compounds of Formula (IV) and (V).

Incorporation of Q groups into the M-J linkage to form the compounds of formulae (I) or (II) above involves addition of compounds of the formula

or

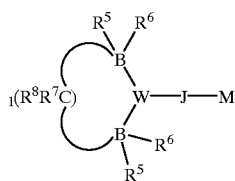

(V)

wherein the symbols have the meanings ascribed above, across the carbon to carbon double bonds in compounds selected from the consisting of one or more conjugated diene hydrocarbons, one or more alkenylsubstituted aromatic compounds, or mixtures of one or more dienes with one or more alkenylsubstituted aromatic compounds to produce new carbon—lithium bonds of an allylic or benzylic nature, similar to those found in a propagating polyalkadiene or polyarylethylene polymer chains derived by anionic initiation of the polymerization of conjugated dienes or arylethylenes. These new carbon—lithium bonds are now "activated" toward polymerization and so are much more efficient in promoting polymerization than the precursor M-J (M=Li) bonds, themselves. The initiators can be prepared as described, for example, in International Publication WO 97/16465, the entire disclosure of which is incorporated by reference. See also U.S. Pat. Nos. 5,496,940 and 5,527,753 (directed to tertiary amino initiators); U.S. Pat. No. 5,600,021 (monofunctional ether initiators); and U.S. Pat. No. 5,362,699 (monofunctional silyl ether initiators).

Exemplary conjugated dienes for producing the chain extended initiator include without limitation 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and the like and mixtures thereof.

Exemplary alkenylsubstituted aromatic compounds for producing the chain extended initiator include without limitation styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphathalene, 1,2-diphenyl-4-methylhexene-1 and the like and mixtures of these, as well as alkyl, cycloalkyl, aryl, alkaryl and aralkyl derivatives thereof in which the total number of carbon atoms in the combined hydrocarbon constituents is generally not greater than 18. Examples of these latter compounds include without limitation 3-methylstyrene, 3,5-diethylstyrene, 4-(tert-butyl)-styrene, 2-ethyl-4-benzylstyrene, 4-phenylstyrene, 4-p-tolylstyrene, 2,4-divinyltoluene, 4,5-dimethyl-1-vinylnaphthalene, and the like and mixtures thereof. Reference is made to U.S. Pat. No. 3,377,404 for disclosures of additional vinyl-substituted aromatic compounds. Non-polymerizable alkenyl-substituted aromatic compounds such as 1,1-diphenylethylene may also be used.

The monomer to be polymerized is selected from the group of conjugated alkadienes, such as butadiene and isoprene, and alkenylsubstituted aromatic compounds, such as styrene and alpha-methylstyrene, and mixtures thereof. The monomers may be polymerized alone, or in admixture to form random copolymers, or by charging the monomers to the reaction mixture sequentially to form block copolymers. Examples of conjugated diene hydrocarbons include, but are not limited to, 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and the like and mixtures thereof. Examples of polymerizable alkenylsubstituted aromatic compounds which can be anionically polymerized include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphathalene, 1,2-diphenyl-4-methyl-1-hexene, and the like and mixtures of these, as well as alkyl, cycloalkyl, aryl, alkaryl and aralkyl derivatives thereof in which the total number of carbon atoms in the combined hydrocarbon constituents is generally not greater than 18. Examples of these latter compounds include; 3-methylstyrene, 3,5-diethylstyrene, 2-ethyl-4-benzylstyrene, 4-phenylstyrene, 4-p-tolylstyrene, 2,4-divinyltoluene and 4,5-dimethyl-1-vinylnaphthalene. Reference is made to U.S. Pat. No. 3,377,404 for disclosures of additional alkenylsubstituted aromatic compounds.

The inert solvent employed during the polymerizations is preferably a non-polar solvent such as a hydrocarbon, since anionic polymerization in the presence of such non-polar solvents is known to produce polyenes with high 1,4-contents from 1,3-dienes. Inert hydrocarbon solvents useful in practicing this invention include but are not limited to inert liquid alkanes, cycloalkanes and aromatic solvents and mixtures thereof. Exemplary alkanes and cycloalkanes include those containing five to 10 carbon atoms, such as pentane, hexane, cyclohexane, methylcyclohexane, heptane, methylcycloheptane, octane, decane and the like and mixtures thereof. Exemplary aryl solvents include those containing six to ten carbon atoms, such as toluene, ethylbenzene, p-xylene, m-xylene, o-xylene, n-propylbenzene, isopropylbenzene, n-butylbenzene, and the like and mixtures thereof.

Polar solvents (modifiers) can be added to the polymerization reaction to alter the microstructure of the resulting polymer, i.e., increase the proportion of 1,2 (vinyl) microstructure or to promote functionalization or randomization. Examples of polar modifiers include, but are not limited to, diethyl ether, dibutyl ether, tetrahydrofuran (THF), 2-methyltetrahydrofuran, methyl tert-butyl ether (MTBE), 1,2-dimethoxyethane (glyme), 1,2-diethoxyethane, diazabicyclo[2.2.2]octane, triethylamine, tributylamine, N-methylpiperidine, N-methylpyrrolidine, N,N,N',N'-tetramethylethylene diamine (TMEDA), and the like and mixtures thereof. The amount of the polar modifier added depends on the vinyl content desired, the nature of the monomer, the temperature of the polymerization, and the identity of the polar modifier. The polar solvent (modifier) can be added to the reaction medium at the beginning of the polymerization as part of the solvent reaction medium or added during the polymerization.

Examples of useful linking or coupling agents include isomeric (mixtures of ortho, meta and para) dialkenylaryls and isomeric di- and trivinylaryls, such as 1,2-divinylbenzene, 1,3-divinylbenzene, 1,4-divinylbenzene, 1,2,4-trivinylbenzenes, 1,3-divinylnaphthalenes, 1,8-divinylnaphthalene, 1,2-diisopropenylbenzene, 1,3- diisopropenylbenzene, 1,4-diisopropenylbenzene, 1,3,5-trivinylnaphthalene, and other suitable materials known in the art to be useful for coupling polymers, as well as mixtures of coupling agents. See also U.S. Pat. Nos. 3,639,517 and 5,489,649, and R. P. Zelinski et al in J. Polym. Sci., A3, 93, (1965) for these and additional coupling agents. Mixtures of coupling agents can also be used. Generally, the amount of coupling agent used is such that the molar ratio of protected living polymer anions to coupling agents ranges from 1:1 to 24:1. This linking process is described, for example, in U.S. Pat. No. 4,409,357 and by L. J. Fetters in Macromolecules, 9, 732 (1976).

These novel polymers can by optionally hydrogenated to afford other novel polymers. The protecting groups can be removed either prior to or following this hydrogenation. The deprotected polymers are also novel. In addition, if the protecting groups on the initiator and electrophile are different, selective deprotection is possible. This will afford novel polymers in which the functionality is exposed on some of the polymer arms, while other functionality is still protected on other arms.

Examples of methods to hydrogenate the polymers of this invention are described in Falk, Journal of Polymer Science: Part A-1, vol. 9, 2617–2623 (1971), Falk, Die Angewandte Chemie, 21, 17–23 (1972), U.S. Pat. Nos. 4,970,254, 5,166,277, 5,393,843, 5,496,898, and 5,717,035. The hydrogenation of the functionalized polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction is conducted until at least 90% of the aliphatic unsaturation has been saturated. The hydrogenated functional polymer is then recovered by conventional procedures, such as removal of the catalyst with aqueous acid wash, followed by solvent removal or precipitation of the polymer.

If desired, the protecting groups can be removed from the multi-arm polymer. This deprotection can be performed either prior to or after the optional hydrogenation of the residual aliphatic unsaturation. For example, to remove tert-alkyl-protected groups, the protected polymer is mixed with Amberlyst® 15 ion exchange resin and heated at an elevated temperature, for example 150° C., until deprotection is complete. In addition, tert-alkyl-protected groups can also be removed by reaction of the star polymer with trifluoroacetic acid, p-toluenesulfonic acid or trimethylsilyliodide. Additional methods of deprotection of the tert-alkyl protecting groups can be found in T. W. Greene and P. G. M. Wuts, Protective Groups in Organic Synthesis, Second Edition, Wiley, New York, 1991, page 41. The tert-butyldimethylsilyl protecting groups can be removed by treatment of the star polymer cement with acid, such as hydrochloric acid, acetic acid, paratoluensulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80–83.

The progress of the deprotection reactions can be monitored by conventional techniques, such as Thin Layer Chromatography (TLC), Nuclear Magnetic Resonance (NMR) spectroscopy, or Infrared (IR) spectroscopy.

The following table details experimental conditions that will selectively remove one of the protecting groups (more labile) from the polymer, while retaining the other protecting group (more stable).

| LABILE | STABLE | CONDITIONS |
|---|---|---|
| t-Butyldimethylsilyl | t-Butyl | Tetrabutylammonium fluoride |
| t-Butyldimethylsilyl | t-Butyl | 1 N HCl |
| t-Butyldimethylsilyl | Dialkylamino | Tetrabutylammonium fluoride |
| t-Butyldimethylsilyl | Dialkylamino | 1 N HCl |
| t-Butyl | Dialkylamino | Amberlyst ® resin |
| t-Amyl | Dialkylamino | Amberlyst ® resin |
| Trimethylsilyl | t-Butyl | Tetrabutylammonium fluoride |
| Trimethylsilyl | t-Butyl | 1 N HCl |
| t-Butyldimethylsilyl | Dialkylamino | Tetrabutylammonium fluoride |
| t-Butyldimethylsilyl | Dialkylamino | 1 N HCl |
| t-Butyldimethylsilyl | t-Butyl | Tetrabutylammonium Fluoride |
| 2,2,5,5-Tetramethyl-2,5-disila-1-azacyclopentane | t-Butyl | 1 N HCl |
| 2,2,5,5-Tetramethyl-2,5-disila-1-azacyclopentane | Dialkylamino | Tetrabutylammonium Fluoride |
| 2,2,5,5-Tetramethyl-2,5-disila-1-azacyclopentane | Dialkylamino | 1 N HCl |

After deprotection and/or optional additional chemistries to the deprotected functional group, the multi-arm polymer can have one of the following structures:

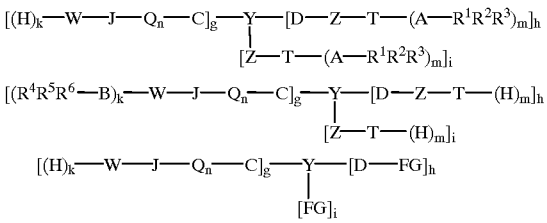

After complete deprotection, the multi-arm polymer can have one of the following structures:

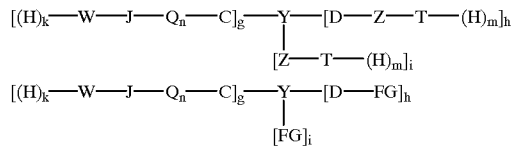

H in each of the above formulae represents hydrogen.

Protecting groups can be removed simultaneously or sequentially. The polymers can optionally be reacted with one or more comonomers to polymerize a functional end thereof and/or an agent capable of changing the functionality of the functional group. For example, the polymers can be reacted with one or more comonomers in the presence of a strong acid catalyst to simultaneously deprotect the functional polymer and polymerize the functional end thereof to produce novel segmented block polymers. Alternatively, the functional groups can be selectively and sequentially deprotected to remove one but not the other(s) of the protecting groups, additional chemistries performed at the liberated functional groups, followed optionally by deprotection and additional chemistries of the remaining protected functional groups.

Exemplary comonomers include without limitation cyclic ethers, diamines, diisocyanates, polyisocyanates, di-, poly- and cyclic amides, di- and polycarboxylic acids, diols, polyols, anhydrides, lactones, and the like and mixtures thereof. For example, functionalized polymers can be further reacted with monofunctional monomers, such as caprolactam, or other lactams, to form a polyamide block polymer segment, or cyclic ethers such ethylene oxide to form polyether blocks; or with difunctional monomers, such as diacids or anhydrides and diamines to form polyamide blocks, or diacids or anhydrides or lactones and diols or polyols to form polyester blocks, or diols and polyols with diisocyanates or polyisocyanates to form polyurethane blocks. Polyisocyanates or polyfunctional polyols are examples of polyfunctional monomers. The functional group may also be reacted with a suitable agent containing a reactive olefinic bond, such as a styrenic or acrylic functionality, such as methacroyl chloride, which will act to change the nature of the functionality and provide a "macromonomer" capable of polymerizing with other free radically polymerizable monomers.

The resulting polymer can be represented by the following formulas:

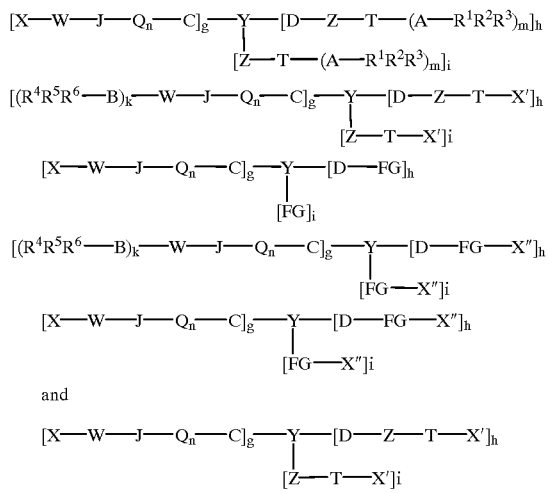

wherein:

R$^1$, R$^2$, R$^3$, R$^4$, R$^5$, R$^6$, A, B, T, W, J, Z, Q, k, m, n, C, Y, D, FG, h, g, and i are the same as defined above, and each X, X' and X" can be the same different and is independently selected from the group consisting of polymer segments derived by incorporation of at least one comonomer reacted with W, T, or FG. In this aspect of the invention, X and X' or X and X" can both be present and have the same chain length. Alternatively, X and X' or X and X" can both be present and have different chain lengths. In yet another aspect, X, X' and X" can be derived from different monomers or mixture of conmonomers.

Advantages of polymers produced by the present invention include highly efficient functionalization of the living anion sites on the arms of the polymer. In addition various combinations of protected functional groups can be introduced. Further, differentially protected heteroatoms can be introduced into the same multi-arm polymer molecule by employing a mixture of functionalizing agents and/or protected functional initiators that contain different heteroatoms. Still further, differentially protected heteroatoms can be introduced into the same multi-arm polymer molecule by employing a mixture of functionalizing agents and/or protected functional initiators that contain different protecting groups.

The present invention will be further illustrated by the following non-limiting examples.

EXAMPLE 1

Preparation of a t-Butyl-t-butyldimethylsilyl Protected Hydroxyl Functionalized Polyisoprene Star Polymer A 500 ml. glass reactor is equipped with four break-seal reagent ampoules, a sampling port attached with a Teflon® stopcock, an inlet tube fitted a septum cap, and a magnetic stir bar. This reactor is flame sealed to a high vacuum line, and evacuated at 120° C. for 8 hours. The flask is refilled with dry argon, and allowed to cool to room temperature. 3-(1,1-Dimethylethoxy)-1-propyllithium chain extended with two equivalents of isoprene, of 15.8 wt. % in cyclohexane, 0.176 grams (0.681 mmoles) is added to the reactor with a syringe via the inlet tube. The reactor is re-evacuated. Dry cyclohexane solvent, 200 ml. is then distilled directly into the reactor. The flask is then removed from the vacuum line by a flame seal. The reactor is then heated to 30° C., and 3.50 grams (51.4 mmole) of isoprene is added from a break seal ampoule. The reaction mixture is held at 50° C. for eight hours to complete the polymerization. When the polymerization is complete, a 2 ml. aliquot is withdrawn through the sample port, and quenched with methanol. The resultant base polymer is analyzed by SEC.

The functionalized star polymer is then formed by the addition 0.45 grams of 55% divinylbenzene (1.9 mmole) ([DVB]/[PILi])=3.0 from a break seal ampoule. The reaction mixture is stirred at 60° C. for nine hours, after which time the reaction mixture is bright red-orange. A mixture of additional isoprene, 0.64 grams (9.3 mmole) and 1,2-dimethoxyethane, 0.15 grams, is then added from a break seal ampoule. This solution is stirred at 60° C. for an additional three hours, to consume all the isoprene. 3-(t-Butyldimethylsilyloxy)-1-chloropropane, 38.93 grams (200 mmole) is then added from the last break seal ampoule. Dry lithium chloride, 8.48 grams (200 mmole) is added via the inlet tube. The reaction mixture is stirred for several hours to complete the functionalization. The polymer is recovered by precipitation two times into methanol, and vacuum dried. The resultant functionalized base polymer is characterized by SEC, and has the following properties:

$M_n$=5530 g/mole
$M_w$=5750 g/mole
$M_w/M_n$=1.04

The intermediate star polymer is characterized by SEC, and has the following properties:

$M_n$=41500 g/mole
$M_w$=47700 g/mole
$M_w/M_n$=1.15

The resultant final, fully functionalized star polymer is fully characterized by $^1$H NMR and SEC, and has the following properties:

$M_n$=45000 g/mole
$M_w$=52200 g/mole
$M_w/M_n$=1.16

The $^1$H NMR spectrum exhibits a peak at 1.17 ppm assigned to the t-butoxy group, and 0.88 ppm assigned to the t-butyldimethylsilyloxy group.

EXAMPLE 2

Preparation of a Partially Deprotected Hydroxyl Functionalized Polyisoprene Star Polymer A 100 ml. round bottom flask was fitted with a magnetic stir bar, a reflux condenser, and a nitrogen inlet. A sample of the t-butyl-t-butyldimethylsilyl protected hydroxyl functionalized polyisoprene star polymer prepared in Example 1 (0.001 moles) is dissolved in tetrahydrofuran (50 ml). Aqueous hydrochloric acid (5 ml, 0.5 N) is added. The solution is heated to reflux, until all the starting material is consumed, as indicated by TLC. analysis (toluene eluant). The partially deprotected multi-arm star polymer is recovered by precipitation two times in methanol, and vacuum dried. Complete deprotection of the t-butyldimethylsilyl group is determined by $^1$H NMR analysis (loss of tert-butyldimethylsilyloxy signal at 0.88 ppm). The t-butyl is still present, as determined by $^1$H NMR (signal at 1.17 ppm).

EXAMPLE 3

Preparation of a Protected Amino, Hydroxyl Functionalized Polyisoprene Star Polymer A 500 ml. glass reactor is equipped with four break-seal reagent ampoules, a sampling port attached with a Teflon® stopcock, an inlet tube fitted a septum cap, and a magnetic stir bar. This reactor is flame sealed to a high vacuum line, and evacuated at 120° C. for 8 hours. The flask is refilled with dry argon, and allowed to cool to room temperature. 3-(2,2,5,5-Tetramethyl-2,5-disila-1-azacyclopentane)-1-propyllithium, of 12.0 wt. % in cyclohexane, 0.207 grams (1.0 mmole) is added to the reactor with a syringe via the inlet tube. The reactor is re-evacuated. Dry cyclohexane solvent, 200 ml. is then distilled directly into the reactor. The flask is then removed from the vacuum line by a flame seal. The reactor is then heated to 30° C., and 4.00 grams (58.7 mmole) of isoprene is added from a break seal ampoule. The reaction mixture is held at 50° C. for eight hours to complete the polymerization. When the polymerization is complete, a 2 ml. aliquot is withdrawn through the sample port, and quenched with methanol. The resultant base polymer is analyzed by SEC.

The functionalized star polymer is then formed by the addition 0.66 grams of 55% divinylbenzene (2.8 mmole) ([DVB]/[PILi])=3.0 from a break seal ampoule. The reaction mixture is stirred at 60° C. for nine hours, after which time the reaction mixture is bright red-orange. A mixture of additional isoprene, 0.93 grams (13.7 mmole) and 1,2-dimethoxyethane, 0.15 grams, is then added from a break seal ampoule. This solution is stirred at 60° C. for an additional three hours, to consume all the isoprene. 3-(1,1-Dimethylethoxy)-1-chloropropane, 30.11 grams (200 mmole) is then added from the last break seal ampoule. Dry lithium chloride, 8.48 grams (200 mmole) is added via the inlet tube. The reaction mixture is stirred for several hours to complete the functionalization. The polymer is recovered by precipitation two times into methanol, and vacuum dried. The resultant functionalized base polymer is characterized by SEC, and has the following properties:

$M_n$=4300 g/mole
$M_w$=4500 g/mole
$M_w/M_n$=1.05

The intermediate protected amino functionalized star polymer is characterized by SEC, and has the following properties:

$M_n$=35100 g/mole
$M_w$=39700 g/mole
$M_w/M_n$=1.13

The resultant final, fully functionalized star polymer is fully characterized by $^1$H NMR and SEC, and has the following properties:

$M_n$=38300 g/mole
$M_w$=43600 g/mole
$M_w/M_n$=1.14

The $^1$H NMR spectrum exhibits a peak at 1.17 ppm assigned to the t-butoxy group.

EXAMPLE 4

Preparation of a Deprotected Amino Protected Hydroxyl Functionalized Polyisoprene Star Polymer A 100 ml. round bottom flask was fitted with a magnetic stir bar, a reflux condenser, and a nitrogen inlet. A sample of the protected amino, hydroxyl functionalized polyisoprene star polymer prepared in Example 3 (0.001 moles) is dissolved in tetrahydrofuran (50 ml). Aqueous hydrochloric acid (5 ml, 0.5 N) is added. The solution is heated to reflux, until all the starting material is consumed, as indicated by TLC analysis (toluene eluant). The partially deprotected multi-arm star polymer is recovered by precipitation two times in methanol, and vacuum dried. Complete deprotection of the protected amine functionality is determined by $^1$H NMR analysis (loss of STABASE signals).ppm). The t-butyl is still present, as determined by $^1$H NMR (signal at 1.17 ppm).

EXAMPLE 5

Preparation of a Partially Protected Hydroxyl Functionalized Polyisoprene Star Polymer A 500 ml. glass reactor is equipped with four break-seal reagent ampoules, a sampling port attached with a Teflon® stopcock, an inlet tube fitted a septum cap, and a magnetic stir bar. This reactor is flame sealed to a high vacuum line, and evacuated at 120° C. for 8 hours. The flask is refilled with dry argon, and allowed to cool to room temperature. 3-(1,1-Dimethylethoxy)-1-propyllithium chain extended with two equivalents of isoprene, of 15.8 wt. % in cyclohexane, 0.176 grams (0.681 mmoles) is added to the reactor with a syringe via the inlet tube. The inlet tube is then flame sealed, and the reactor is re-evacuated. Dry cyclohexane solvent, 200 ml. is then distilled directly into the reactor. The flask is then removed from the vacuum line by a flame seal. The reactor is then heated to 30° C., and 3.50 grams (51.4 mmoles) of isoprene is added from a break seal ampoule. The reaction mixture is held at 50° C. for eight hours to complete the polymerization. When the polymerization is complete, a 2 ml. aliquot is withdrawn through the sample port, and quenched with methanol. The resultant base polymer is analyzed by SEC.

The functionalized star polymer is then formed by the addition 0.45 grams of 55% divinylbenzene (1.9 mmole) ([DVB]/[PILi])=3.0 from a break seal ampoule. The reaction mixture is stirred at 60° C. for nine hours, after which time the reaction mixture is bright red-orange. A mixture of additional isoprene, 0.64 grams (9.3 mmole) and 1,2-dimethoxyethane, 0.15 grams, is then added from a break seal ampoule. This solution is stirred at 60° C. for an additional three hours, to consume all the isoprene. Dry ethylene oxide, 8.80 grams (200 mmole) is then added from a lecture bottle, via the sample port. The reaction mixture is stirred for several hours to complete the functionalization.

Finally, degassed methanol, 10 ml., is added from the last break seal ampoule. The polymer is recovered by precipitation two times into methanol, and vacuum dried.

The resultant functionalized base polymer is characterized by SEC, and has the following properties:

$M_n$=5530 g/mole
$M_w$=5750 g/mole
$M_w/M_n$=1.04

The intermediate star polymer is characterized by SEC, and has the following properties:

$M_n$=41500 g/mole
$M_w$=47700 g/mole
$M_w/M_n$=1.15

The resultant final, fully functionalized star polymer is fully characterized by $^1$H NMR and SEC, and has the following properties:

$M_n$=45000 g/mole
$M_w$=52200 g/mole
$M_w/M_n$=1.16

The $^1$H NMR spectrum exhibits a peak at 1.17 ppm assigned to the t-butoxy group.

EXAMPLE 6

Preparation of Protected Amino, Hydroxy Functionalized Polybutadiene Star

A 500 ml. glass reactor is equipped with five break-seal reagent ampoules, a sampling port attached with a Teflon® stopcock, an inlet tube fitted a septum cap, and a magnetic stir bar. This reactor is flame sealed to a high vacuum line, and evacuated at 120° C. for 8 hours. The flask is refilled with dry argon, and allowed to cool to room temperature. 3-(t-Butyldimethylsilyloxy)-1-propyllithium 16.52 wt. % in cyclohexane, 1.32 grams (7.33 mmoles) is added to the reactor with a syringe via the inlet tube. The reactor is re-evacuated. Dry cyclohexane solvent, 292.00 grams (374.84 ml.), and N,N,N',N'-tetramethylethylenediamine, 1.70 grams (14.66 mmole, 2.00 equivalents) are then distilled directly into the reactor. The flask is then removed from the vacuum line by a flame seal. The reactor is then heated to 30° C., and 29.20 grams (540 mmole) of butadiene is added from a break seal ampoule. The reaction mixture is held at 30° C. for twenty-four hours to complete the polymerization. The reactor is intermittently degassed several times during five hours to remove any residual butadiene.

Styrene, 1.87 grams (18 mmole) is then added from a break seal ampoule ([butadiene]/[styrene])=30. The reaction mixture is then placed in a constant temperature bath at 50° C. for eight hours to complete the polymerization. The polymerization reaction is monitored by UV/Vis spectra for disappearance of the polybutadienyl absorbance at 290 nm. A 2 ml. aliquot is withdrawn through the sample port, and quenched with methanol. The resultant base polymer is analyzed by SEC.

The star polymer is then formed by the addition 4.83 grams of 55% divinylbenzene (20.4 mmole) ([DVB]/[PBD-b-PSLi])=3.0 from a break seal ampoule. The reaction mixture is stirred at 60° C. for nine hours. Additional butadiene, 6.80 grams (126 mmoles) is then added from a break seal ampoule. The reaction is held at 30° C. for eight hours to complete the polymerization. 3-(Dimethylamino)-1-chloropropane, 24.30 grams (200 mmole) is then added from the last break seal ampoule. Dry lithium chloride, 8.48 grams (200 mmole) is added via the inlet tube. The reaction mixture is stirred for several hours to complete the functionalization. The polymer is recovered by precipitation two times into methanol, and vacuum dried.

The resultant functionalized base polymer is characterized by SEC, and has the following properties:

$M_n$=4570 g/mole
$M_w$=4940 g/mole
$M_w/M_n$=1.08

The intermediate star polymer is characterized by SEC, and has the following properties:

$M_n$=35400 g/mole
$M_w$=42500 g/mole
$M_w/M_n$=1.20

The resultant functionalized star polymer is fully characterized by $^1$H NMR and SEC, and has the following properties:

$M_n$=39000 g/mole
$M_w$=47200 g/mole.
$M_w/M_n$=1.21

The $^1$H NMR spectrum indicated a 1,4:1,2 ratio of 6:4, and exhibited a peak at 0.88 ppm assigned to the t-butyldimethylsilyloxy group.

EXAMPLE 7

Preparation of a Deprotected Hydroxyl Amino Functionalized Polybutadiene Star Polymer A 100 ml. round bottom flask was fitted with a magnetic stir bar, a reflux condenser, and a nitrogen inlet. A sample of the t-butyldimethylsilyl protected hydroxyl functionalized polybutadiene star polymer polymer prepared in Example 6 (0.001 moles) is dissolved in tetrahydrofuran (50 ml). Aqueous hydrochloric acid (5 ml, 0.5 N) is added. The solution is heated to reflux, until all the starting material is consumed, as indicated by TLC. analysis (toluene eluant). The partially deprotected multi-arm star polymer is recovered by precipitation two times in methanol, and vacuum dried. Complete deprotection of the t-butyldimethylsilyl group is determined by $^1$H NMR analysis (loss of tert-butyldimethylsilyloxy signal at 0.88 ppm).

The foregoing examples are illustrative of the present invention and are not to be construed as limiting thereof. The invention is defined by the following claims, with equivalents of the claims to be included therein.

That which is claimed is:

1. A multi-arm star polymer comprising a compound selected from the group consisting of:

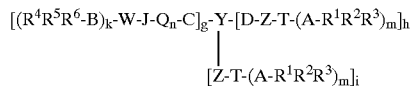

and

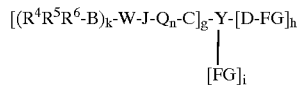

wherein:
  $R^1$, $R^2$, $R^3$, $R^4$, $R^5$, and $R^6$ are each independently selected from the group consisting of hydrogen, alkyl, substituted alkyl, aryl, substituted aryl, cycloalkyl, and substituted cycloalkyl, or $R^4$ is optionally a —$(CR^7R^8)_1$— group linking two B when k is 2, or $R^3$ is optionally a —$(CR^7R^8)_1$— group linking two A when m is 2, wherein $R^7$ and $R^8$ are each independently selected from the group consisting of hydrogen, alkyl, substituted alkyl, aryl, substituted aryl, cycloalkyl, and substituted cycloalkyl and 1 is an integer from 1 to 7;

A and B are each independently selected from Group IVa of the Periodic Table of the Elements;

T and W are each independently selected from the group consisting of oxygen, sulfur, and nitrogen and mixtures thereof;

J is a branched or straight chain hydrocarbon connecting group which contains 3–25 carbon atoms, optionally substituted with aryl or substituted aryl;

Z is a branched or straight chain hydrocarbon connecting group which contains 1–25 carbon atoms, optionally substituted with aryl or substituted aryl;

Q is an unsaturated or saturated hydrocarbyl group derived by incorporation of one or more conjugated diene hydrocarbons, one or more alkenylsubstituted aromatic compounds, or mixtures of one or more dienes with one or more alkenylsubstituted aromatic compounds;

k and m are each independently 1 when T or W is oxygen or sulfur, and 2 when T or W is nitrogen;

n is an integer from 0 to 5;

C represents a hydrogenated or unsaturated block derived by anionic polymerization of one or more conjugated dienes, one or more alkenylsubstituted aromatic compounds, or a mixture thereof, and having a peak molecular weight from 1000 to 10,000 as measured by GPC;

Y represents a crosslinked core derived by incorporation of a molecule having at least two independently polymerized vinyl groups;

D represents a hydrogenated or unsaturated block derived by anionic polymerization of one or more conjugated dienes, one or more alkenylsubstituted aromatic compounds, or a mixture thereof, and having a peak molecular weight from 400 to 40,000 as measured by GPC;

FG is a protected or unprotected functional group; and h is 1 to 40; g is 1 to 50; and i is <20, with the proviso that both g and h are not 1.

2. The polymer of claim 1, wherein at least one of said —(B—$R^4R^5R^6$)$_k$ groups and said —(A—$R^1R^2R^3$)$_m$ groups comprises a tertiary alkyl protecting group.

3. The polymer of claim 1, wherein at least one of said —(B—$R^4R^5R^6$)$_k$ groups and said —(A—$R^1R^2R^3$)$_m$ groups comprises a tertiary-butyldimethyl silyl protecting group.

4. The polymer of claim 1, wherein said —(B—$R^4R^5R^6$)$_k$ groups and said —(A—$R^1R^2R^3$)$_m$ groups are different.

5. The polymer of claim 4, wherein at least one of said —(B—$R^4R^5R^6$)$_k$ groups and said —(A—$R^1R^2R^3$)$_m$ groups comprises a tertiary alkyl protecting group and the other of said —(B—$R^4R^5R^6$)$_k$ and said —(A—$R^1R^2R^3$)$_m$ groups comprises a tertiary-butyldimethyl silyl protecting group.

6. The polymer of claim 5, wherein said —(B—$R^4R^5R^6$)$_k$ group comprises a tertiary alkyl protecting group and said —(A—$R^1R^2R^3$)$_m$ group comprises a tertiary-butyldimethyl silyl protecting group.

7. The polymer of claim 5, wherein said —(B—$R^4R^5R^6$)$_k$ group comprises a tertiary-butyldimethyl silyl protecting group and said —(A—$R^1R^2R^3$)$_m$ group comprises a tertiary alkyl protecting group.

8. A multi-arm star polymer comprising a compound selected from the group consisting of:

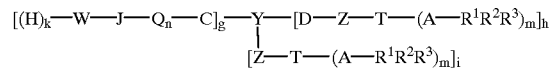

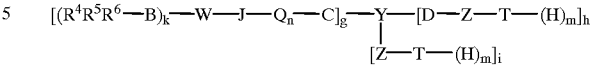

and

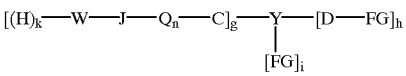

wherein:

$R^1, R^2, R^3, R^4, R^5$, and $R^6$ are each independently selected from the group consisting of hydrogen, alkyl, substituted alkyl, aryl, substituted aryl, cycloalkyl, and substituted cycloalkyl, or $R^4$ is optionally a —(CR$^7$R$^8$)$_1$— group linking two B when k is 2, or $R^3$ is optionally a —(CR$^7$R$^8$)$_1$— group linking two A when m is 2, wherein $R^7$ and $R^8$ are each independently selected from the group consisting of hydrogen, alkyl, substituted alkyl, aryl, substituted aryl, cycloalkyl, and substituted cycloalkyl and 1 is an integer from 1 to 7;

A and B are each independently selected from Group IVa of the Periodic Table of the Elements;

T and W are each independently selected from the group consisting of oxygen, sulfur, and nitrogen and mixtures thereof;

J is a branched or straight chain hydrocarbon connecting group which contains 3–25 carbon atoms, optionally substituted with aryl or substituted aryl;

Z is a branched or straight chain hydrocarbon connecting group which contains 1–25 carbon atoms, optionally substituted with aryl or substituted aryl;

Q is an unsaturated or saturated hydrocarbyl group derived by incorporation of one or more conjugated diene hydrocarbons, one or more alkenylsubstituted aromatic compounds, or mixtures of one or more dienes with one or more alkenylsubstituted aromatic compounds;

k and m are each independently 1 when T or W is oxygen or sulfur, and 2 when T or W is nitrogen;

n is an integer from 0 to 5;

C represents a hydrogenated or unsaturated block derived by anionic polymerization of one or more conjugated dienes, one or more alkenylsubstituted aromatic compounds, or a mixture thereof, and having a peak molecular weight from 1000 to 10,000 as measured by GPC;

Y represents a crosslinked core derived by incorporation of a molecule having at least two independently polymerized vinyl groups;

D represents a hydrogenated or unsaturated block derived by anionic polymerization of one or more conjugated dienes, one or more alkenylsubstituted aromatic compounds, or a mixture thereof, and having a peak molecular weight from 400 to 40,000 as measured by GPC;

FG is a protected or unprotected functional group; and h is 1 to 40; g is 1 to 50; and i is <20, with the proviso that both g and h are not 1.

9. The polymer of claim 8, wherein at least one of said —(B—$R^4R^5R^6$)$_k$ groups and said —(A—$R^1R^2R^3$)$_m$ groups comprises a tertiary alkyl protecting group.

10. The polymer of claim 8, wherein at least one of said —(B—$R^4R^5R^6$)$_k$ groups and said —(A—$R^1R^2R^3$)$_m$ groups is a tertiary-butyldimethyl silyl protecting group.

11. A multi-arm star polymer of the formula

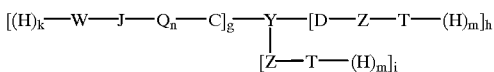

wherein:

T and W are each independently selected from the group consisting of oxygen, sulfur, and nitrogen and mixtures thereof;

J is a branched or straight chain hydrocarbon connecting group which contains 3–25 carbon atoms, optionally substituted with aryl or substituted aryl;

Z is a branched or straight chain hydrocarbon connecting group which contains 1–25 carbon atoms, optionally substituted with aryl or substituted aryl;

Q is an unsaturated or saturated hydrocarbyl group derived by incorporation of one or more conjugated diene hydrocarbons, one or more alkenylsubstituted aromatic compounds, or mixtures of one or more dienes with one or more alkenylsubstituted aromatic compounds;

k and m are each independently 1 when T or W is oxygen or sulfur, and 2 when T or W is nitrogen;

n is an integer from 0 to 5;

C represents a hydrogenated or unsaturated block derived by anionic polymerization of one or more conjugated dienes, one or more alkenylsubstituted aromatic compounds, or a mixture thereof, and having a peak molecular weight from 1000 to 10,000 as measured by GPC;

Y represents a crosslinked core derived by incorporation of a molecule having at least two independently polymerized vinyl groups;

D represents a hydrogenated or unsaturated block derived by anionic polymerization of one or more conjugated dienes, one or more alkenylsubstituted aromatic compounds, or a mixture thereof, and having a peak molecular weight from 400 to 40,000 as measured by GPC; and h is 1 to 40; g is 1 to 50; and i is <20, with the proviso that both g and h are not 1.

12. A multi-arm polymer comprising a compound selected from the group consisting of:

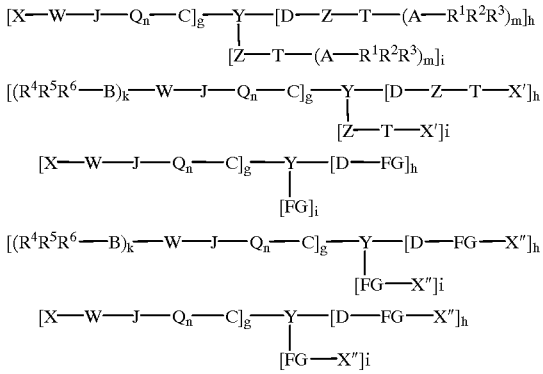

and

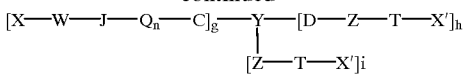

wherein:

$R^1, R^2, R^3, R^4, R^5$, and $R^6$ are each independently selected from the group consisting of hydrogen, alkyl, substituted alkyl, aryl, substituted aryl, cycloalkyl, and substituted cycloalkyl, or $R^4$ is optionally a $-(CR^7R^8)_1-$ group linking two B when k is 2, or $R^3$ is optionally a $-(CR^7R^8)_1-$ group linking two A when m is 2, wherein $R^7$ and $R^8$ are each independently selected from the group consisting of hydrogen, alkyl, substituted alkyl, aryl, substituted aryl, cycloalkyl, and substituted cycloalkyl and 1 is an integer from 1 to 7;

A and B are each independently selected from Group IVa of the Periodic Table of the Elements;

T and W are each independently selected from the group consisting of oxygen, sulfur, and nitrogen and mixtures thereof;

J is a branched or straight chain hydrocarbon connecting group which contains 3–25 carbon atoms, optionally substituted with aryl or substituted aryl;

Z is a branched or straight chain hydrocarbon connecting group which contains 1–25 carbon atoms, optionally substituted with aryl or substituted aryl;

Q is an unsaturated or saturated hydrocarbyl group derived by incorporation of one or more conjugated diene hydrocarbons, one or more alkenylsubstituted aromatic compounds, or mixtures of one or more dienes with one or more alkenylsubstituted aromatic compounds;

k and m are each independently 1 when T or W is oxygen or sulfur, and 2 when T or W is nitrogen;

n is an integer from 0 to 5;

C represents a hydrogenated or unsaturated block derived by anionic polymerization of one or more conjugated dienes, one or more alkenylsubstituted aromatic compounds, or a mixture thereof, and having a peak molecular weight from 1000 to 10,000 as measured by GPC;

Y represents a crosslinked core derived by incorporation of a molecule having at least two independently polymerized vinyl groups;

D represents a hydrogenated or unsaturated block derived by anionic polymerization of one or more conjugated dienes, one or more alkenylsubstituted aromatic compounds, or a mixture thereof, and having a peak molecular weight from 400 to 40,000 as measured by GPC;

FG is a protected or unprotected functional group;

h is 1 to 40; g is 1 to 50; and i is <20, with the proviso that both g and h are not 1; and each X, X' and X" can be the same or different and is independently selected from the group consisting of polymer segments derived by incorporation of at least one comonomer reacted with W, T, or FG.

13. The polymer of claim 12, wherein said comonomer is selected from the group consisting of lactams, cyclic ethers, diisocyanates, polyisocyanates, diamides, polyamides, cyclic amides, dicarboxylic acids, polycarboxylic acids, diols, polyols, anhydrides, lactones and mixtures thereof.

14. The polymer of claim 12, wherein X and X' or X and X" are both present and wherein X and X' or X and X" have the same chain length.

15. The polymer of claim 12, wherein X and X' or X and X" are both present and wherein X and X' or X and X" have different chain lengths.

16. The polymer of claim 12, wherein X, X' and X" are derived from different monomers or mixture of comonomers.

17. The polymer of claim 12, wherein at least one of said W, T or FG comprises a hydroxyl group and further wherein at least one of said X—W, X'—T or X—FG blocks comprises a polyurethane block resulting from the reaction of said hydroxyl group with diisocyanate and diol.

18. The polymer of claim 12, wherein at least one of said W, T or FG comprises a hydroxyl group and further wherein at least one of said X—W, X'—T or X—FG blocks comprises a polyamide block resulting from the reaction of said one hydroxyl group with diacid or anhydride and diamine or from a lactam.

19. The polymer of claim 12, wherein at least one of said W, T or FG comprises a hydroxyl group and further wherein at least one of said X—W, X'—T or X—FG blocks comprises a polyester block resulting from the reaction of said one hydroxyl group with diacid or anhydride or lactone and diol or polyol.

20. A process for preparing multi-arm star polymers, comprising:

polymerizing one or more monomers selected from the group consisting of conjugated dienes, alkenylsubstituted aromatic compounds, and mixtures thereof with one or more protected functional alkali metal initiators of the following structures:

 (I)

or

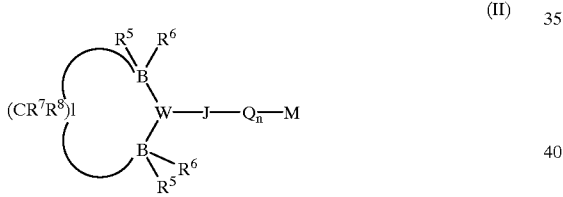 (II)

wherein:

M is an alkali metal selected from the group consisting of lithium, sodium and potassium;

$R^4$, $R^5$, $R^6$, $R^7$, and $R^8$ are each independently selected from the group consisting of hydrogen, alkyl, substituted alkyl, aryl, substituted aryl, cycloalkyl, and substituted cycloalkyl;

B is an element selected from Group IVa of the Periodic Table of the Elements;

W is selected from the group consisting of oxygen, sulfur, and nitrogen and mixtures thereof;

J is a branched or straight chain hydrocarbon connecting group which contains 3–25 carbon atoms, optionally substituted with aryl or substituted aryl;

Q is an unsaturated or saturated hydrocarbyl group derived by incorporation of one or more conjugated diene hydrocarbons, one or more alkenylsubstituted aromatic compounds, or mixtures of one or more dienes with one or more alkenylsubstituted aromatic compounds; l is an integer from 1 to 7;

k is 1 when W is oxygen or sulfur, and 2 when W is nitrogen; and n is an integer from 0 to 5, to form living polymer anions;

coupling said living polymer anions to form a multi-arm living star polymer having a central core;

polymerizing one or more conjugated dienes, one or more alkenylsubstituted aromatic compounds, or mixtures thereof to grow living polymer arms from the central core of the multi-arm polymer; and end capping said living polymer arms with one or more electrophiles to form a polymer comprising a compound selected from the group consisting of

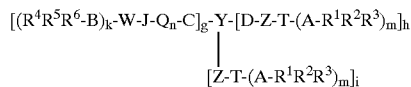

and

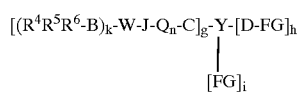

wherein:

$R^4$, $R^5$, $R^6$, B, W, J, Q, k, and n are as defined above, or $R^4$ is optionally a —$(CR^7R^8)_l$— group linking two B when k is 2, or $R^3$ is optionally a —$(CR^7R^8)_l$— group linking two A when m is 2, wherein $R^7$, $R^8$, and l are as defined above;

C represents a hydrogenated or unsaturated block derived by anionic polymerization of one or more conjugated dienes, one or more alkenylsubstituted aromatic compounds, or a mixture thereof, and having a peak molecular weight from 1000 to 10,000 as measured by GPC;

Y represents a crosslinked core derived by incorporation of a molecule having at least two independently polymerized vinyl groups;

D represents a hydrogenated or unsaturated block derived by anionic polymerization of one or more conjugated dienes, one or more alkenylsubstituted aromatic compounds or a mixture thereof, and having a peak molecular weight from 400 to 40,000 as measured by GPC;

—Z—T—$(A—R^1R^2R^3)_m$ is an end group derived by reaction with an electrophile of the formula

 (III)

wherein:

X is halogen selected from the group consisting of chloride, bromide and iodide;

Z is a branched or straight chain hydrocarbon connecting group which contains 1–25 carbon atoms, optionally substituted with aryl or substituted aryl;

T is selected from the group consisting of oxygen, sulfur, and nitrogen and mixtures thereof;

A is an element selected from Group IVa of the Periodic Table of the Elements;

$R^1$, $R^2$, and $R^3$ are each independently selected from the group consisting of hydrogen, alkyl, substituted alkyl, aryl, substituted aryl, cycloalkyl, and substituted cycloalkyl, or $R^3$ is optionally a —$(CR^7R^8)_l$— group linking two A when m is 2; and m is 1 when T is oxygen or sulfur, and 2 when T is nitrogen;

FG is a protected or unprotected functional group derived by reaction with an electrophile other than a compound of formula III; and h is 1 to 40; g is 1 to 50; and i is <20, with the proviso that both g and h are not 1.

21. The process of claim 20, further comprising removing at least one of said —(B—R$^4$R$^5$R$^6$)$_k$ or —(A—R$^1$R$^2$R$^3$)$_m$ groups to liberate at least one functional group W or T.

22. The process of claim 21, wherein said removing step comprises selectively removing at least one of said —(B—R$^4$R$^5$R$^6$)$_k$ or —(A—R$^1$R$^2$R$^3$)$_m$ groups to liberate at least one functional group W or T without removing the other of said —(B—R$^4$R$^5$R$^6$)$_k$ or —(A—R$^1$R$^2$R$^3$)$_m$ groups.

23. The process of claim 21, wherein said removing step comprises simultaneously removing said —(B—R$^4$R$^5$R$^6$)$_k$ and —(A—R$^1$R$^2$R$^3$)$_m$ groups to liberate both of said functional groups W and T.

24. The process of claim 21, further comprising reacting said liberated functional group with at least one comonomer to form a polymer segment.

25. The process of claim 24, wherein at least one of said W, T or FG comprises a hydroxyl group and wherein said at least one comonomer comprises diisocyanate and diol to form polyurethane blocks.

26. The process of claim 24, wherein at least one of said W, T or FG comprises a hydroxyl group and wherein said at least one comonomer comprises diacid or anhydride and diamine or from a lactam to form polyamide blocks.

27. The process of claim 24, wherein at least one of said W, T or FG comprises a hydroxyl group and wherein said at least one comonomer comprises diacid or anhydride or lactone and diol or polyol to form polyester blocks.

28. The process of claim 24, wherein said removing step and said reacting step occur simultaneously.

29. The process of claim 21, further comprising reacting at least one of said liberated functional groups under conditions sufficient to modify the functionality thereof to incorporate a reactive olefinic bond.

30. The process of claim 20, further comprising hydrogenating said polymer.

31. The process of claim 21, wherein said polymer has the formula

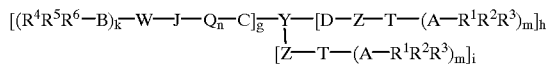

and wherein said removing step comprises removing said —(B—R$^4$R$^5$R$^6$)$_k$ groups to form a polymer of the formula

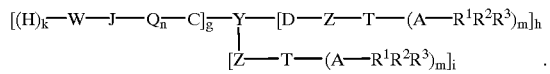

32. The process of claim 21, wherein said polymer has the formula

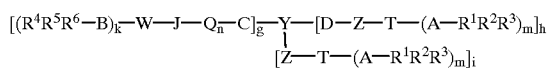

and wherein said removing step comprises removing said —(A—R$^1$R$^2$R$^3$)$_m$ groups to form a polymer of the formula

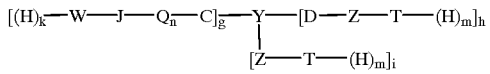

33. The process of claim 21, wherein said polymer has the formula

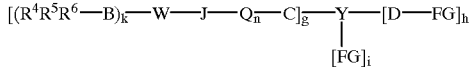

and wherein said removing step comprises removing said —(B—R$^4$R$^5$R$^6$)$_k$ groups to form a polymer of the formula

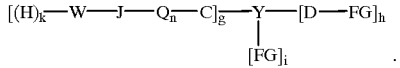

34. The process of claim 21, wherein said polymer has the formula

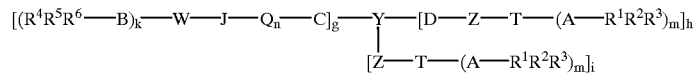

and wherein said removing step comprises removing said —(B—R$^4$R$^5$R$^6$)$_k$ and said —(A—R$^1$R$^2$R$^3$)$_m$ groups to form a polymer of the formula

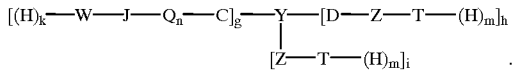

35. The process of claim 34, wherein said removing step comprises removing said —(B—R$^4$R$^5$R$^6$)$_k$ and said —(A—R$^1$R$^2$R$^3$)$_m$ groups simultaneously.

36. The process of claim 34, wherein said removing step comprises removing said —(B—R$^4$R$^5$R$^6$)$_k$ and said —(A—R$^1$R$^2$R$^3$)$_m$ groups sequentially.

37. The process of claim 34, wherein at least one of said —(B—R$^4$R$^5$R$^6$)$_k$ groups and said —(A—R$^1$R$^2$R$^3$)$_m$ groups comprises a tertiary alkyl protecting group.

38. The process of claim 34, wherein at least one of said —(B—R$^4$R$^5$R$^6$)$_k$ groups and said —(A—R$^1$R$^2$R$^3$)$_m$ groups is a tertiary-butyldimethyl silyl protecting group.

39. The process of claim 34, wherein said —(B—R$^4$R$^5$R$^6$)$_k$ groups and said —(A—R$^1$R$^2$R$^3$)$_m$ groups are different.

40. The process of claim 39, wherein at least one of said —(B—R$^4$R$^5$R$^6$)$_k$ groups and said —(A—R$^1$R$^2$R$^3$)$_m$ groups comprises a tertiary alkyl protecting group and the other of said —(B—R$^4$R$^5$R$^6$)$_k$ and said —(A—R$^1$R$^2$R$^3$)$_m$ groups comprises a tertiary-butyldimethyl silyl protecting group.

41. The process of claim 40, wherein said —(B—R$^4$R$^5$R$^6$)$_k$ group comprises a tertiary alkyl protecting group and said —(A—R$^1$R$^2$R$^3$)$_m$ group comprises a tertiary-butyldimethyl silyl protecting group.

42. The process of claim 40, wherein said —(B—R$^4$R$^5$R$^6$)$_k$ group comprises a tertiary-butyldimethyl silyl protecting group and said —(A—R$^1$R$^2$R$^3$)$_m$ group comprises a tertiary alkyl protecting group.

* * * * *